United States Patent [19]

Lalin et al.

[11] Patent Number: 4,691,577
[45] Date of Patent: Sep. 8, 1987

[54] SOAP FILM GAS FLOWMETER

[76] Inventors: Hill S. Lalin, 10 Bonita Ter., Wayne, N.J. 07470; Jorge E. Bermudez, 55 Ave. B, Haledon, N.J. 07508; William T. Fleming, 286 Green Village Rd., Green Village, N.J. 07935

[21] Appl. No.: 837,847
[22] Filed: Mar. 10, 1986
[51] Int. Cl.[4] .................. G01F 1/708; G01F 25/00
[52] U.S. Cl. .................................. 73/861.05; 73/3
[58] Field of Search ......................... 73/861.05, 3

[56] References Cited

U.S. PATENT DOCUMENTS

| 2,949,764 | 8/1960 | Knauth | 73/3 |
|---|---|---|---|
| 3,248,941 | 5/1966 | McArthur | 73/861.05 |
| 3,277,707 | 10/1966 | Rödel | 73/861.05 |
| 3,308,660 | 3/1967 | De Ford | 73/861.05 |
| 3,323,362 | 6/1967 | Wells | 73/861.05 |

FOREIGN PATENT DOCUMENTS 143822 9/1980 German Democratic Rep. ...... 73/3

Primary Examiner—Tom Noland
Attorney, Agent, or Firm—Eugene Lieberstein

[57] ABSTRACT

A soap film gas flowmeter comprising a hollow flow tube having opposite open ends through which a soap bubble is propelled with one open end extending into a first closed chamber housing the soap solution and the opposite open end extending into a second chamber. Inlet gas is fed into the first chamber, passed through the flowtube and discharged from the second chamber. A manually movable piston like member is provided for generating a soap bubble at the bottom open end of the flowtube. The flowtube has an opening in it for providing an open passageway for inlet gas to pass through the flowtube when the bottom open end of the flowtube is covered by the soap solution.

22 Claims, 13 Drawing Figures

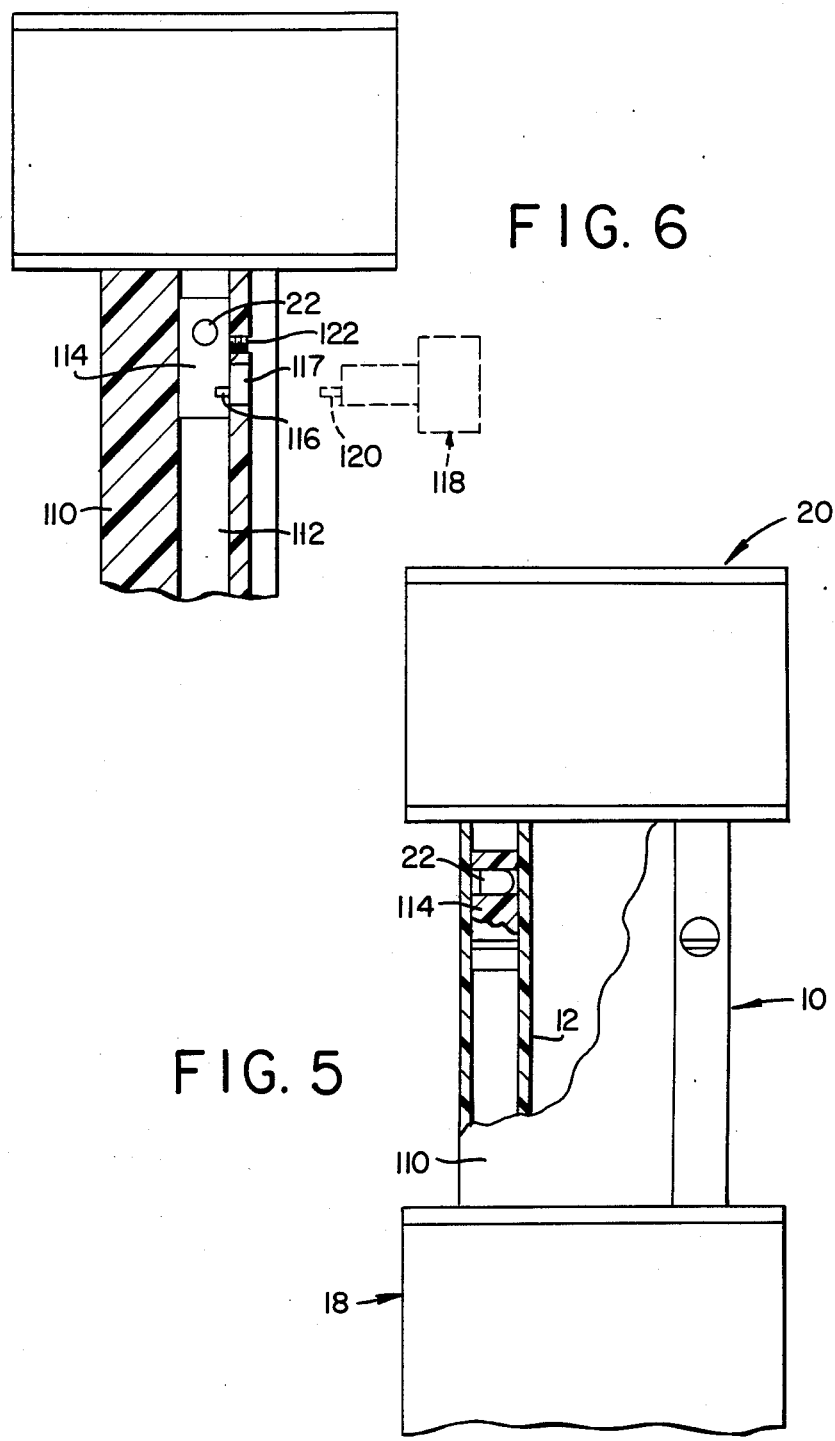

SOAP FILM GAS FLOWMETER

This invention relates to gas flow measuring devices and more particularly to a soap film gas flowmeter.

BACKGROUND OF INVENTION

Accurate measurement of gas flow is necessary in the operation or control of many processes. It is, for example, customary to sample the atmosphere of a workplace or hostile environment to detect the presence of a specific constituent or contaminant and its concentration. This is done by drawing a known volume of air through an air sampling system containing one or more filters or sorbent tubes which may be directly or subsequently analyzed to quantify the leval of the constituent or contaminant in the air sample. The accuracy in calculating the concentration of any specific constituent in the air sample depends upon the accuracy in the rate of air flow through the air sampling equipment.

One method for measuring air flow is to time the displacement of a film of soap solution between two points in a flowtube. This may be done manually using a calibrated burette and a stop watch. The average flow rate is calculated from the timed rate of rise of the soap film over a defined volume. In conventional commercial units, the soap film is generated as a soap bubble from a soap solution contained in a rubber bulb mounted on the bottom of the burette. Air is directed into the burette through an opening immediately above the level of the soap solution. The rubber bulb is squeezed raising the soap solution to a level to block the inlet opening. Releasing the bulb drops the solution below the inlet opening and a soap bubble is stripped from the solution. Alternatively, the calibrated burette may have an open bottom with the top connected to a suction source. In this configuration, the bubble is generated by raising a container of soap solution to cover the open bottom and lowering it. In each configuration the soap bubble rises through the calibrated burette as a thin film of soap with essentially zero resistance to air flow. The position of the soap film may be be detected visually or electro-optically. Flow measurement is then calculated from a measurement of the transit time of the soap film between two fixed positions along the burette. This calculation may also be automatically performed and displayed on a counter.

The soap film is propelled through the flow tube at a velocity proportional to the flow rate of the air or gas to be measured. The actual velocity varies inversely with the square of the flow tube diameter. Higher velocities introduce turbulence at the surface of the soap solution which aggravates bubble generation. Accordingly, the larger the flow tube diameter the easier it is to generate a soap bubble and conversely the smaller the diameter the more difficult it is to generate a soap bubble. However, for a flowmeter to have practical utility the diameter and length of the flow tube must be limited and preferably miniaturized. When a flow tube with a fixed small diameter and length is used the ability to generate a single coherent soap bubble becomes the major design limitation of the flow meter. This inability to genarate a single soap bubble and the inability to sustain the soap film in the flow tube particularly at higher flow rates of e.g. above 8 liters per minute, has been the major limitation of prior art film flowmeter designs.

Any conventional soap solution composition may be used to form soap bubbles. The inlet air or gas to be measured operates as a driving force which generates the soap film from the soap solution. As the air flow rate is increased, the soap solution becomes agitated resulting in a foam at the surface of the soap solution. Foaming of the soap solution makes it extremely difficult to produce a single coherent soap bubble and is likely to produce inaccurate readings when read electro-optically.

A pulsation in the air flow will cause a sudden change in pressure across the soap film. If the pressure variation is large enough, the soap film or bubble will burst. If the soap film should burst the residue of soap solution must drain out through the flow tube interfering with the subsequently generated soap bubble thereby limiting the interval of time between measurements. It is the present practice in all commercially available flowmeters to forcibly rupture the soap film when it reaches the top of the flow tube so as to force the soap solution to drain backwards through the flowtube. This inherently limits the time interval between successive measurements.

OBJECTS OF THE INVENTION

It is an object of the present invention to overcome the above described disadvantages of the prior art by providing a soap film gas flowmeter which can generate a single soap bubble under positive manual control from very low to extremely high flow rates of up to 30 liters per minute or more.

It is a further object of the present invention to provide a soap film gas flowmeter which operates to drain the soap film externally of the flow tube and to return the soap residue back to the soap solution reservoir.

It is an even further object of the present invention to provide a soap film gas flowmeter which attenuates and minimizes any pulsations in gas flow through the flow meter.

It is yet another object of the present invention to provide a soap film gas flowmeter which reduces the incipient velocity of the soap bubble at the entrance of the flow tube.

SUMMARY OF THE INVENTION

In accordance with the present invention, a soap film gas flowmeter is provided including a flow tube having a hollow body with opposite open ends through which a soap film is propelled comprising a first closed chamber housing a soap solution; means for supporting the flow tube in a substantially vertical position with the bottom open end of the flow tube disposed in the first chamber above the soap solution; a second closed chamber into which the open top end of the flow tube extends, gas inlet means extending into the first chamber for introducing gas at a flow rate to be measured; gas exit means extending into the second chamber for discharging the gas; means for forming a single soap bubble which rises as a soap film through said flow tube; and an opening in the flow tube for providing an open passageway for inlet gas to pass through the flow tube when the bottom open end of the flow tube is covered by soap solution. The gas flowmeter further includes means for dampening pulsations through the flow tube.

The soap film gas flowmeter of the present invention also contains means for draining the soap film from the flow tube and for returning the residue to the soap solution externally of the flow tube. The flowmeter is designed to permit the soap film upon reaching the open top end of the flow tube to balloon outwardly and includes barrier means spaced apart from the open top end of the flow tube for contacting the soap film, means for collecting the residue of soap film after it collapses and a drain tube for returning accumulated residue of soap film to the soap solution chamber.

In the preferred embodiment of the present invention, the flow tube includes a hole of predetermined size juxtaposed above the bottom end of the flow tube through which inlet gas may flow. Means are provided to adjustably control the size of the opening relative to the magnitude of the rate of gas flow into the flowmeter.

In another embodiment of the present invention the flow tube is designed with an open flared bottom end positioned above the soap solution in the first chamber. The open flared bottom end has a diameter substantially larger than the diameter of the body portion of the flow tube for reducing the incipient velocity of the newly generated soap film.

BRIEF DESCRIPTION OF THE DRAWING

Other features, objects and advantages of the present invention will become apparent from the following detailed description of the invention when read in conjunction with the accompanying drawings of which:

FIG. 5 is a view of a modified version of the flowmeter of FIG. 1 and FIG. 4 for permitting the position of the electro-optical elements to be adjusted, shown partly in vertical section and partly in elevation; and FIG. 6 is an end view in section of FIG. 5 with the adjusting key shown in phantom lines.

DETAILED DESCRIPTION OF INVENTION

Figure 1:
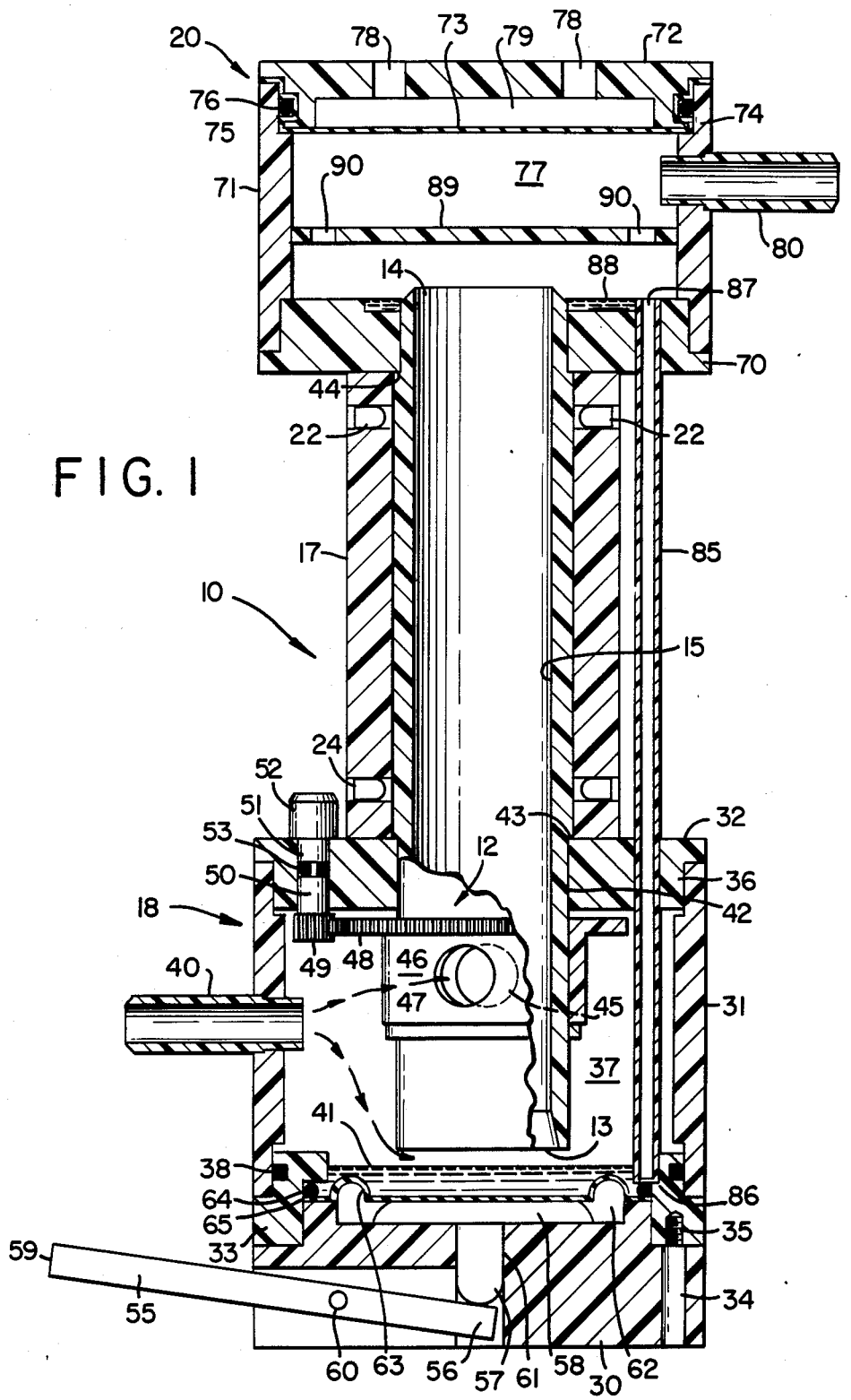
FIG. 1 is a view in vertical section of the preferred embodiment of the flowmeter of the present invention.
Figure 4:
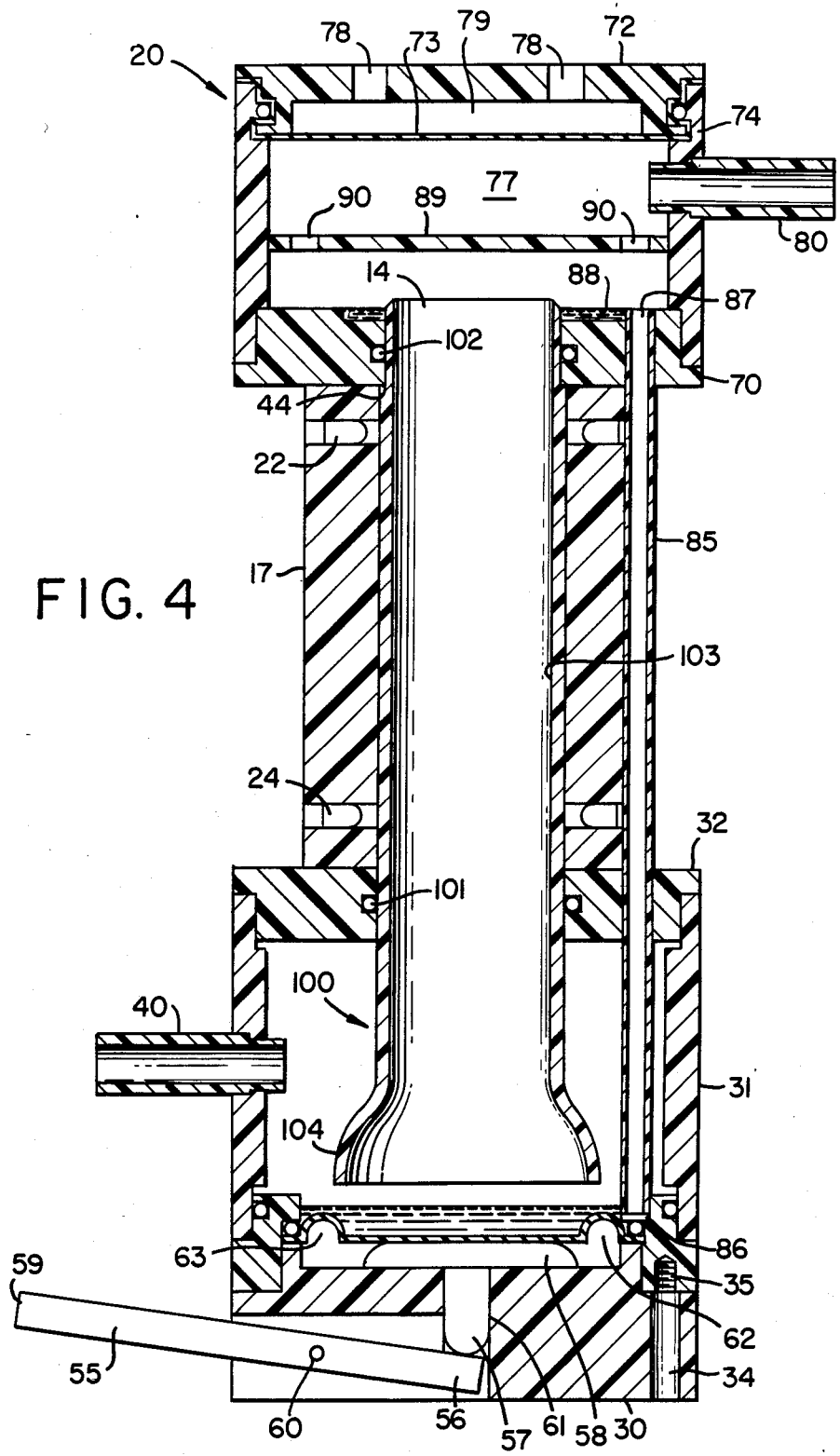
FIG. 4 is a view, in vertical section of an alternative embodiment of the flow meter of the present invention.

The soap film gas flowmeter of the present invention is identified by the reference numeral 10 in both embodiments of the invention as shown in FIGS. 1 and 4. In like manner, all common features to both embodiments have been given the same reference numbers. As more particularly shown in FIG. 1, the flowmeter 10 comprises a hollow flow tube 12 having a bottom open end 13, a top open end 14, and a cylindrical body 15 with a uniform diameter extending over the length of the flow tube. The flow tube 12 is mounted in a block 17 supported between a lower assembly 18 and an upper assembly 20. The block 17 is preferably transparent and contains two sets of conventional optical photodetector sensing elements 22 and 24 respectively. The photodetectors 22 and 24 are spaced a fixed distance apart along the flow tube 12 and operate to measure the displaced transit time of a soap film as it moves between the two sensor locations. The operation of the photodetectors 22 and 24 and the method of calculating the transit time between the sensor locations is conventional and does not form a part of the present disclosure. Moreover, for purposes of the present invention the sensors 22 and 24 need not be photoelectrical devices and the transit time may be measured using a stop watch by visually observing the position of the soap film as is conventionally done with a calibrated burette.

The lower assembly 18 of the flowmeter 10 includes a base support 30, an upright wall 31 and a top wall 32. The upright wall 31 is a tubular body mounted upon an annular member 33 which is secured to the base support 30 by means of screws (not shown) placed in the aligned openings such as 34 and 35 respectively. The top wall 32 is mounted over the upright wall 31 and securely affixed thereto preferably by bonding the mating surfaces 36 using a conventional adhesive or cement to form a closed chamber 37. A conventional O-ring seal 38 is placed between the upright wall 31 and the annular member 33 to seal the chamber 37 from the atmosphere. An inlet conduit 40 extends into the chamber 37 through the upright wall 31. The inlet conduit 40 is connected to an air or gas supply (not shown) for introducing air for gas into the chamber 37 at a flow rate to be measured by the flowmeter 10. A supply of a conventional soap solution 41 is introduced into the chamber 37 through the inlet conduit 40 to a level preferably no higher than the height of annular member 33.

The flow tube 12 extends into the chamber 37 through an opening 42 in the top wall 32 with the open bottom end 13 suspended directly above the soap solution 41. The body 15 of the flow tube 12 is machined down at its opposite ends to form a lower ledge 43 and an upper ledge 44 respectively. The lower ledge 43 supports the flow tube 12 over the lower assembly 18 and maintains the position of the bottom open end 13 in the chamber 37. The body 15 of the flow tube 12 is preferably cemented to the top wall 32 about the opening 42. Alternatively, an O-ring can be used if the flow tube 12 is to be removable.

The flow tube 12 has a relatively large opening or hole 45, of preferably up to about ½ inch in diameter, located between the open bottom end 13 and the top wall 32 of the lower assembly 18. The hole 45 may have any geometry although a round or elliptical geometry is preferred. A cylindrical band 46 of molded plastic material is rotatably mounted over the flow tube 12 surrounding the hole 45. The band 46 includes a hole 47 preferably conforming in size and shape to the hole 45. A gear drive, including a rack 48 and a pinion 49, is used to adjustably rotate the band 46 to align the position of the hole 4/ relative to the hole 45. The rack 48 is mounted over the band 46 and engages the pinion 49 which is mounted on a shaft 50. The shaft 50 extends through an opening 51 in the top wall 32 terminating in a manually adjustable knurled knob 52. An O-ring 53 is mounted around the shaft 50 to prevent leakage from the closed chamber 37 through the opening 51. The band 46 is rotatably adjusted by turning the knob 52 which positions the hole 47 over the hole 45. By turning the knob 52 the relative size opening between the two holes 45 and 47 may be adjusted. In this way, the hole 45 can be completely closed off or adjustably opened to provide an opening of adjustable size leading from the chamber 37 into the flow tube 12.

A soap film is generated from the soap solution 41 by manually depressing a movable lever 55 which is pivotally connected to the base support 30 of the lower assembly 18. The lever 55 has one end 56 abutting the stem 57 of a piston-like member having a piston head 58. The opposite end 59 of the lever 55 is a free end which extends outwardly from the flowmeter 10. The lever 55 pivots about a fulcrum point 60 formed by connecting the lever to the base support 30 through a conventional non-threaded lug (not shown) about which the lever 55 is rotatably movable. The piston stem 57 extends through a bore 61 in the base support 30 whereas the piston head 58 is mounted upon the base support in a recess 52. A membrane 63 of a flexible or elastic material such as rubber is mounted over the piston head 58. The membrane 63 has an annular bead 64 which is seated in an annular groove 65 formed between an extension of the member 33 and the base support 30 to suspend the membrane over the piston head 58. The annular bead 64 also acts as a seal between the annular member 33 and the base support 30.

The upper assembly 20 includes a lower wall 70, an upright wall 71 and a top wall 72. The upright wall 71 is a tubular body mounted upon and cemented to the lower wall 70. A flexible diaphragm 73 of elastic material is mounted over an annular ledge 74 in the upright wall 71 and is held securely in place at its periphery between a depending section 75 of the top wall 72 and the annular ledge 74. An O-ring 76 is mounted around the elastic material, which forms the diaphragm 73, to hold the elastic material taut and to form a seal between the top wall 72 and the upright wall 71. A closed chamber 77 is formed in the space between the diaphragm 73, the upright wall 71, and the lower wall 70. The open top end 14 of the flow tube 12 extends into the closed chamber 77 through the lower wall 70 to form an overhang with the lower wall 70. The lower wall is mounted abutting against the upper ledge 44 of the flow tube. In this position the flow tube is preferably cemented to the lower wall 70. An exit conduit 80 extends into the chamber 77 through the upright wall 71 for discharging the air or gas directed through the flowmeter 10. The top wall 72 has openings 78 for providing direct communication between the ambient atmosphere and the space 79 directly above the diaphragm 73.

A drain tube 85, mounted adjacent to the support block 17, extends from the upper assembly 20 into the chamber 37 of the lower assembly 18. The drain tube 85 has an open bottom end 86 submerged beneath the soap solution 41.

The drain tube 85 also has an open top end 87 which extends vertically below the open top end 14 of the flow tube and slightly below the level of a well or trough 88 formed in the lower wall 70 for collecting the residue of soap solution after each soap film collapses. A barrier wall 89 supported by the upright wall 71 in the closed chamber 77 lies in a plane transverse to the longitudinal axis of the flow tube 12. The barrier wall 89 has openings 90 adjacent the wall 71 to assure direct communication between the flow tube 12 and the exit conduit 80. The barrier wall 89 is separated from the top end 14 of the flow tube to permit the soap film to balloon outwardly before contacting the barrier wall.

Figure 2A:
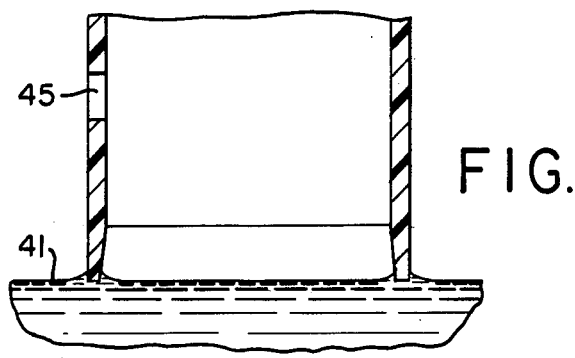
FIGS. 2A through 2E are diagrammatic representations of the progression of the formation of a single soap bubble in accordance with the present invention.
Figure 2B:
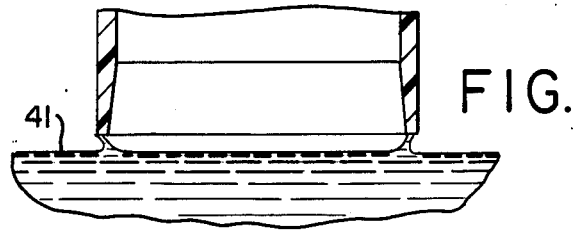
Figure 2C:
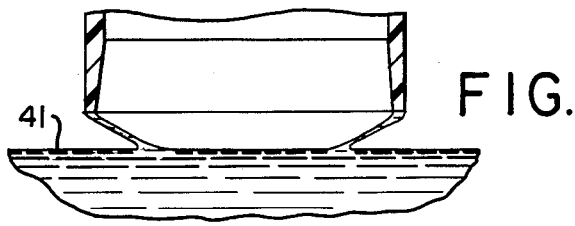
Figure 2D:
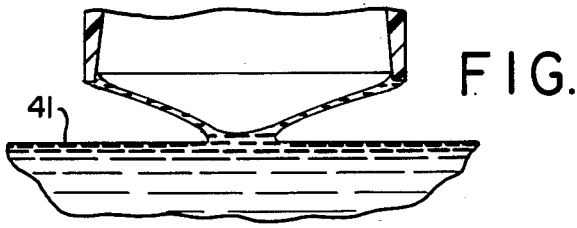
Figure 2E:
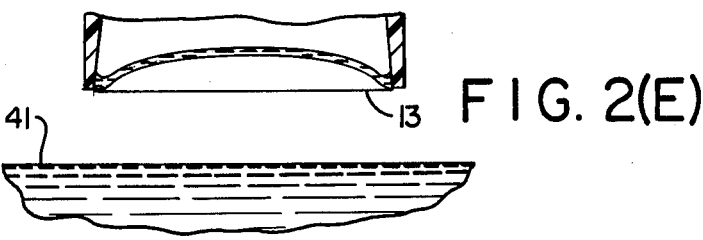

The flowmeter 10 is operated by momentarily depressing and releasing the free end 59 of the manual lever 55. Depressing the free end 59 causes the opposite end 56 to rise which lifts up the stem 57 and piston head 58. Raising the piston head 58 raises the membrane 63 which raises the soap solution to the level of the bottom end 13 of the flow tube 12. Upon releasing the lever 55, air flowing into chamber 37 from inlet conduit 40 will cause a soap bubble to be stripped from the surface of the soap solution 41. The formation of the soap bubble follows the progression shown diagrammatically in FIGS. 2A through 2E. In FIG. 2A the soap solution has contacted the open bottom end 13 of the flow tube. No further air passes into the flow tube 12 except through the overlapping opening between the holes 45 and 47 as shown in FIG. 1. Upon releasing the manual lever 55 the soap solution 41 recedes from the bottom end of the flowtube 12, as shown in FIGS. 2B and 2C, to form the soap bubble. The soap bubble continues to bridge the space between the open bottom end 13 of the flow tube and the surface of the receding soap solution 41 as shown in FIG. 2D until it breaks off as shown in FIG. 2E. Since the soap film offers no resistance to air flow it is immediately propelled up the flow tube. The soap film will pass around the hole 45 as it moves up the flow tube. Actually, the soap film encircles the hole 45 in order to pass around it.

The hole 45 in the flow tube 12 is used in the embodiment of FIG. 1 to provide control over the formation of a soap bubble independently of the inlet air flow rate. As shown in FIG. 1 the inlet air passes into the flow tube 12 through the hole 45 and through the open bottom end 13 of the flow tube. When the diameter of the flow tube is small its incipient velocity is high. The hole 45 proportions the air flow through the open bottom end 13 of the flow tube 12 which minimizes any tendency of foaming at the surface of the soap solution and permits a soap bubble to be formed at a proportionally lower velocity. The size of the hole 45 is adjustable through adjustment of the knob 52. The hole size should be increased for high operating air flow rates and decreased for low operating air flow rates.

Pulsations in air flow air attenuated in the flow tube 12 by the flexible diaphragm 73 which operates as a damper. Any pulsations or sudden changes in the rate of air flow through the flow tube 12 will deflect the diaphragm 73 to attenuate the pulsation. A pulsation in gas flow occurs each time a soap bubble is generated. Pulsations may also be present in the incoming air flow with its magnitude dependent upon how well the air flow is regulated.

Figure 3A:
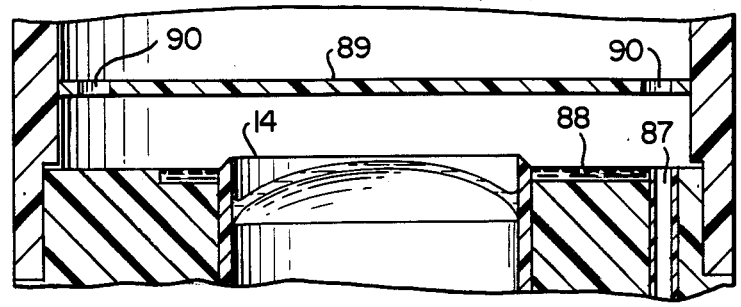
FIGS. 3A through 3D are diagrammatic representations of the progression of the soap film at the top open end of the flow tube leading to its collapse.
Figure 3B:
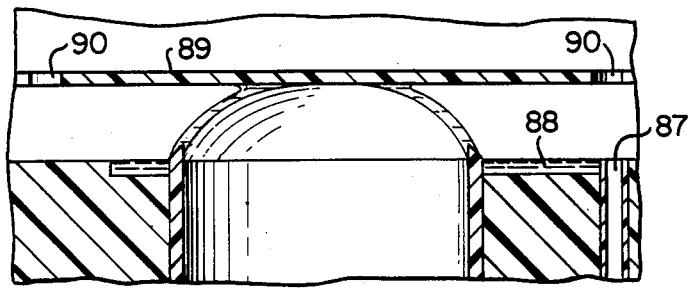
Figure 3C:
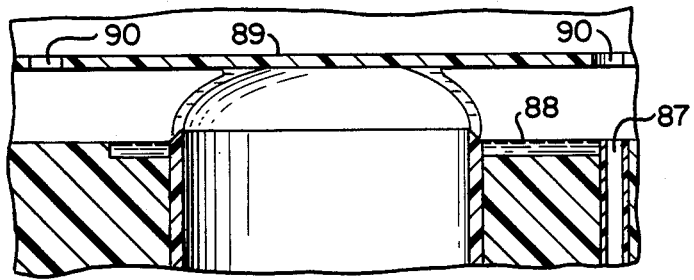
Figure 3D:
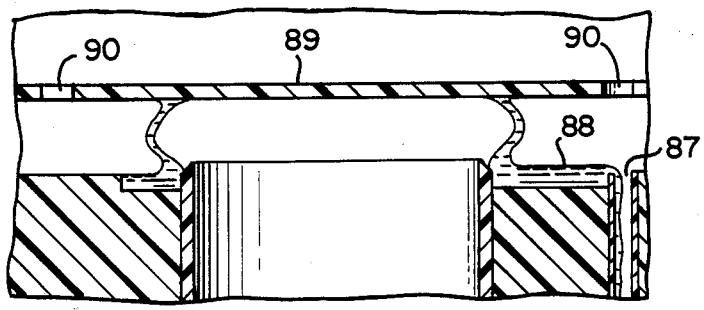

When the soap film reaches the open the end 14 of the flow tube 12 the soap film is forced to balloon outwardly until it contacts the barrier wall 89. Upon contacting the barrier wall 89 the soap film spreads laterally finally collapsing into the trough 88 from where the residue of soap solution is partially drained and recovered. The progression of events prior to collapse of the soap film is diagrammatically shown in FIGS. 3A through 3D. In FIG. 3A the soap film is adjacent the open top end of the flow tube 12. In FIG. 3B the soap film is shown contacting the barrier wall 89. The impelled air causes the soap film to balloon into the configuration of FIG. 3B. In FIGS. 3C and 3D the soap film is shown expanding laterally. Contact between the soap film and the top end 14 of the flow tube 12 is transferred to the solution of accumulated soap residue in the trough 88. Continued lateral expansion of the soap film causes the film to burst away from the flow tube 12. The residue is collected in the trough 88. Overflow from the trough 88 falls through the drain tube 85 back into the soap solution 41.

An alternate embodiment of the flowmeter 10 of the present invention is shown in FIG. 4. The principal distinctions between the arrangement of FIG. 4 and FIG. 1 lies in the geometry of the flow tube 100 and the absence of the control opening or hole 45 in the flow tube 100. The flow tube 100 is also sealed from the lower chamber 37 and from the upper chamber 77 by means of O-rings 101 and 102 respectively. This latter feature is to permit the flow tube 100 to be readily assembled and removed if necessary. It is otherwise of minor significance to the operation of the flowmeter 10.

The flow tube 100 is a hollow tube having a cylindrical body 103 similar to its counterpart in the flow tube 12 of FIG. 1 and a flared bottom end 104, the diameter of which is substantially larger than the diameter of the body 103. The substantially larger diameter of the flow tube 100 at the flared end 104 establishes an incipient velocity for any newly generated soap film which is proportionally lower than the velocity which the soap film will have as it is impelled through the body 103 of the flow tube and in a direct relative relationship between the diameter at the flared end 104 to the diameter of the flow tube body 103. As the soap film moves upstream of the flared end 104 the concentration of the soap film increases making the soap film thicker, stronger and of greater integrity. This permits relatively higher air flow rates depending on how large the flared diameter is relative to the diameter of the body of the flow tube.

Although the embodiment of FIG. 4 does not incorporate the feature of an adjustable control hole 45 this feature may obviously be included for use in combination with the use of a flared geometry.

In FIGS. 5 and 6 the flowmeter 10 of FIGS. 1 and 4 is shown modified to permit the position of the photoelectrical elements (LED's) 22 to be adjusted in a vertical direction. The block 110 is a transparent tubular member equivalent to block 17 of FIGS. 1 and 4 having a channel 112 formed therein. A movable guide member 114 having the photoelectrical element 22 mounted therein, is positioned within the channel 112 at a desired height along the flowtube 12 to provide fine calibration for the flow tube. A second guide member (not shown) is positioned opposite the first guide member 114 e.g. displaced 180 degrees from the first guide member and at a height level with the first guide member 114 to receive the transmitted light. The guide member 114 contains a slot 116 which operates as a keyway for adjusting the vertical position of the guide member 114 and photoelectrical element 22. An opening 117 is located in the block 110 at the fine adjustment height position of the member 114 to communicate with the slot 116. An adjusting key 118 having a pin 120 is used to control the calibration adjustment for the position of the guide member 114. Rotation of the key 118 rotates the pin 120 in the slot 116 to provide the fine adjustment. In this way, the guide member 114 can be accurately adjusted to permit calibration of the flowmeter independent of variations in tolerance between flowtubes 12. Thus the flowmeter 10 can be calibrated for precise accuracy. A set screw 122 is used to lock the guide member 114 in place. The lower set of photoelectric sensing elements 24 of FIGS. 1 and 4 do not need fine adjustment.

What is claimed is:

1. A soap film gas flowmeter comprising: a flow tube having a hollow body with opposite open ends through which a soap film is propelled, a first closed chamber housing a soap solution; means for supporting said flow tube in a substantially vertical position with the open bottom end of the flow tube disposed in said first chamber above said soap solution; a second closed chamber into which the open top end of said flow tube extends; gas inlet means for introducing gas into said first chamber at a flow rate to be measured using the flowmeter; gas exit means for discharging the gas introduced into said first chamber through said second chamber; means for generating a single soap bubble from said soap solution substantially at the bottom end of said flow tube and a relatively large opening in said flowtube for providing an open passageway for inlet gas to pass through said flowtube when said bottom open end of said flowtube is covered by said soap solution.

2. A soap film gas flowmeter as defined in claim 1 wherein said flowtube extends between a lower assembly forming said first chamber and an upper assembly forming said second chamber and further comprising diaphragm means in said upper assembly for dampening pulsations in gas flow through said flow tube.

3. A soap film gas flowmeter as defined in claim 2 wherein said means for generating a soap film comprises manual control means for raising the soap solution to the open bottom end of the flow tube and releasing same.

4. A soap film gas flowmeter as defined in claim 3 wherein said manual control means comprises; a piston like member having a piston head and a stem and a manually adjustable lever pivotally connected to said stem for raising and lowering said piston head in response to the manual depression of said lever and a flexible membrane suspended over said piston head beneath said soap solution such that upon depressing said lever said membrane is raised to raise said soap solution and upon release of said lever said membrane is lowered.

5. A soap film gas flowmeter as defined in claims 2 or 4 further comprising means for draining the soap film externally of said flowtube.

6. A soap film gas flowmeter as defined in claim 5 wherein said drain comprises:
   barrier means disposed above said open top end of said flowtube for allowing the soap film to expand and balloon outwardly from said open top end before contacting said barrier means;
   a solution trough in said second chamber for providing a continuation of the wetted surface beyond the flowtube; and
   a drain tube extending from said trough into the soap solution within said first chamber for returning accumulated residue of soap solution from said trough to said soap solution.

7. A soap film gas flowmeter as defined in claim 6 wherein said barrier means comprises a flat plate disposed in said second chamber above said flowtube in a plane lying substantially transverse to a central longitudinal axis of said flowtube.

8. A soap film flowmeter as defined in claim 5, wherein said opening in said flowtube is a hole of predetermined size at a location in said first chamber above the open bottom end thereof for providing direct ingress into said flow tube through said hole by said inlet gas.

9. A soap film flowmeter as defined in claim 8 further comprising manually controlled shutter means covering said hole for controlling the size opening of said hole to said first chamber.

10. A soap film flowmeter as defined in claim 9 wherein said manually controlled shutter means comprises means surrounding said flow tube about said hole with said means including a second hole and a gear drive for rotatably adjusting said means for controlling the position and alignment of said second hole with respect to said hole in said flow tube.

11. A soap film flowmeter as defined in claim 5 further comprising two sets of photoelectric sensing elements and means for mounting said sensing elements a predetermined distance apart along said flowtube between said upper assembly and said lower assembly.

12. A soap film flowmeter as defined in claim 11 further comprising means for adjusting at least one set of said elements in a vertical direction for calibrating said flowmeter.

13. A soap film flowmeter as defined in claim 12 further comprising a tubular block surrounding said flowtube, said tubular block having a channel opposite sides, guide means slidably mounted in each channel with each guide means having a photoelectric element mounted therein, and a keyway in each guide means adapted for insertion of a key to adjust the vertical position of said guide means in said channel for calibrating the vertical position of said photoelectric elements.

14. A soap film flowmeter as defined in claim 3 wherein said flowtube is of a substantially constant uniform diameter.

15. A soap film flowmeter as defined in claim 3 wherein said flowtube has a flared bottom end with a diameter substantially greater than the diameter of its body.

16. A soap film flowmeter comprising: a flowtube having a hollow body and opposite open ends through which a soap film is propelled, said flowtube being substantially vertically aligned between a first closed chamber into which the bottom open end of said flowtube extends and a second closed chamber into which the top open end of said flowtube extends: gas inlet means for introducing gas into said flowmeter through said first chamber at a flow rate to be measured using the flowmeter: gas exit means for discharging said gas from said flowmeter through said second chamber; a soap solution contained in said first chamber below the bottom open end of said flowtube; a control opening in said flowtube of predetermined size disposed above the bottom open end thereof within said first chamber for providing an open passageway for inlet gas to pass through said flowtube when the bottom open end of said flowtube is covered by said soap solution; means for generating a single soap bubble from said soap solution at the open bottom end of the flowtube and shutter means for adjustably controlling the size of said control opening.

17. A soap film flowmeter as defined in claim 16 wherein said shutter means comprises a band surrounding the flowtube and said control opening, said band having a hole of predetermined size covering said control opening and means for rotatably adjusting said band for adjusting the position of said hole relative to said control opening.

18. A soap film flowmeter as defined in claim 17 wherein said means for rotatably adjusting said band is a gear drive.

19. A soap film flowmeter as defined in claims 16 or 17 further comprising means for externally draining the soap film from said flowtube after the soap film reaches the top open end of said flowtube comprising barrier means disposed above said open top end of said flowtube for allowing the soap film to balloon outwardly from said open top before contacting said barrier means; and a drain tube located externally of said flow tube for draining the residue of soap solution after collapse of said soap film.

20. A soap film flowmeter as defined in claim 19 wherein said drain tube extends back into said soap solution.

21. A soap film flowmeter as defined in claim 19 further comprising means for dampening pulsations in gas flow through said flowtube.

22. A soap film flowmeter as defined in claim 21 wherein said flowtube extends between a lower assembly forming said first chamber and an upper assembly forming said second chamber and wherein said means for dampening pulsations in gas flow through said flowtube comprises diaphragm means disposed in said upper assembly above said flowtube and communicating on one side with said second chamber and on the opposite side with the ambient atmosphere.

* * * * *